US012756302B1

(12) United States Patent
Nour et al.

(10) Patent No.: US 12,756,302 B1

(45) Date of Patent: Oct. 6, 2026

(54) POWER CONVERTER ASSEMBLY WITH VERTICALLY ARRANGED PASSIVE COMPONENTS

(71) Applicant: Lotus Microsystems ApS, Hvidovre (DK)

(72) Inventors: Yasser A. A. Nour, Copenhagen (DK); Kyungsoo Rho, Copenhagen (DK); Hoà Lê Thanh, Copenhagen (DK)

(73) Assignee: LOTUS MICROSYSTEMS APS, Hvidovre (DK)

(*) Notice: Subject to any disclaimer, the term of this patent is extended or adjusted under 35 U.S.C. 154(b) by 0 days.

(21) Appl. No.: 19/454,547

(22) Filed: Jan. 21, 2026

(30) Foreign Application Priority Data

Nov. 5, 2025 (EP) .................................... 25213738

(51) Int. Cl.
*H02M 3/00* (2006.01)
*H02M 3/07* (2006.01)

(52) U.S. Cl.
CPC ............. *H02M 3/003* (2021.05); *H02M 3/07* (2013.01)

(58) Field of Classification Search
CPC ................................ H02M 3/003; H02M 3/07
See application file for complete search history.

(56) References Cited

U.S. PATENT DOCUMENTS 7,046,522 B2 * 5/2006 Sung ........................ H05K 1/11 174/262
11,823,906 B2 * 11/2023 DeLaCruz .......... H10P 90/1914
12,525,541 B2 * 1/2026 Nour ...................... H05K 1/183
2025/0096200 A1 * 3/2025 Butzen ................. H10W 90/00

* cited by examiner

Primary Examiner — Emily P Pham
(74) *Attorney, Agent, or Firm* — COATS & BENNETT, PLLC

(57) ABSTRACT

The present disclosure regards a stacked power converter assembly comprising: a passive sub-assembly comprising a plurality of structures comprising a top and a bottom structure; a plurality of passive components, each comprising at least one terminal or a plurality of terminals, wherein the plurality of passive components is arranged on the bottom structure; at least one routing structure, wherein the at least one routing structure is configured to provide a vertical connection between the top and the bottom structures and an active sub-assembly comprising at least one integrated circuit, wherein the active sub-assembly is arranged on the top structure. A method of manufacturing a stacked power converter assembly and a switched-capacitor DC-DC converter is also disclosed.

20 Claims, 7 Drawing Sheets

POWER CONVERTER ASSEMBLY WITH VERTICALLY ARRANGED PASSIVE COMPONENTS

This application claims priority to European Application No. 25213738.5, filed Nov. 5, 2025, the disclosure of which is incorporated in its entirety by reference herein.

The present disclosure relates to the field of power electronics, and more particularly to power management modules and converter assemblies for electronic devices. The disclosure concerns architectures and packaging techniques for integrating passive and active electronic components in three-dimensional configurations to improve power efficiency, current handling capability, solution size, and thermal performance.

BACKGROUND

As electronic devices continue to evolve toward higher integration, increased functionality, and reduced form factors, efficient power delivery has become a fundamental challenge. Conventional power management modules rely on planar arrangements of passive components mounted on a single substrate. In such architectures, current and power are distributed laterally across the surface of the substrate, which inevitably leads to extended conduction paths, parasitic losses, and limited current density. These effects are particularly detrimental in high-performance computing and data center applications, where compact designs must still deliver high current with minimal losses and stable voltage regulation.

Existing approaches have sought to mitigate these issues through miniaturization of components, optimized layouts, and improved materials. However, such measures provide only incremental gains because the overall geometry of power delivery remains essentially two-dimensional. Even when multiple circuit boards or subassemblies are stacked, the electrical interconnections between them are typically long and indirect, often relying on solder joints, vias, or wires that introduce resistive and inductive parasitics. These limitations become critical as switching frequencies increase and as the demand for fast, stable, and efficient power conversion grows.

Thermal management poses an additional difficulty in conventional power modules. As power density increases, the heat generated by integrated circuits and surrounding passives must be effectively removed to prevent degradation and failure. Traditional flat-module architectures offer limited heat conduction paths and often rely on bulky external heat sinks. This not only increases the overall module thickness but also restricts the design flexibility for compact systems, such as mobile or embedded devices. Moreover, maintaining signal integrity while simultaneously managing thermal dissipation and mechanical stability remains a complex trade-off in conventional designs.

SUMMARY

It is therefore an objective of the present disclosure to provide an improved power management architecture that enables compact design, enhanced electrical performance, and efficient thermal dissipation, thereby overcoming the limitations of conventional planar and multi-board power supply assemblies.

As disclosed here, this can be achieved by a stacked power converter assembly comprising: a passive sub-assembly comprising a plurality of structures comprising a top and a bottom structure; a plurality of passive components, each comprising at least one terminal or a plurality of terminals, wherein the plurality of passive components is arranged on the bottom structure; at least one routing structure, wherein the at least one routing structure is configured to provide a vertical connection between the top and the bottom structures; an active sub-assembly comprising at least one integrated circuit, wherein the active sub-assembly is arranged on the top structure.

The stacked power converter assembly as disclosed herein can enable a three-dimensional integration of passive and active components, resulting in shorter electrical conduction paths and reduced parasitic resistance and inductance. By allowing power and current to be transferred vertically through the stack, energy losses can be minimized while maintaining high current density and efficient power distribution. The arrangement of the passive components on multiple structures may also allow a large number of passive components to be incorporated within a limited footprint, leading to improved passive component density, such as for capacitors and/or inductors, and power stability without increasing the lateral size of the stacked power converter assembly. The stacked power converter assembly configuration may further provide improved electrostatic discharge (ESD) resistance owing to the compact interconnect geometry and low impedance paths. Moreover, the reduced interconnection length can also enable high-speed signal transfer within the stacked power converter assembly, supporting applications requiring rapid power and data processing.

The stacked architecture of the power converter as disclosed herein can facilitate modular and scalable designs that can accommodate multiple layers of passives and routing structures. Each layer may be configured to provide both electrical and thermal conduction, thereby enhancing both performance and reliability. The routing structure may be implemented as a central or peripheral structure that provides flexible signal routing while separating power and signal paths, reducing electromagnetic interference and improving signal integrity. Advantageously, in some embodiments, the routing structure can be an interposer, which can provide both electrical and thermal coupling between adjacent structures. The interposer may include conductive paths configured to distribute power or transfer signals while simultaneously forming a heat conduction path between the stacked structures. By using a thermally conductive material or by integrating thermal vias within the interposer, as disclosed in some embodiments, heat generated by the passive components or by the active sub-assembly can be efficiently transferred through the stack toward a heat sink or exposed surface. This configuration contributes to a uniform temperature distribution within the module and improves overall thermal reliability without increasing the module thickness.

The use of an active sub-assembly positioned on top of the passive components and the plurality of structures can allow the at least one integrated circuit to be thermally coupled to the underlying network of passive components while minimizing the distance between the at least one integrated circuit and its associated passive components. This proximity can reduce transient response time and may improve the dynamic performance of the stacked power converter assembly. In some embodiments, the inclusion of one or more thermal guides or exposed metallic surfaces within the active sub-assembly enables effective dissipation of heat from the at least one integrated circuit and other high-power components through the vertical direction of the stacked power converter assembly.

Through this combination of vertical electrical connection, optimized thermal paths, and compact packaging, the stacked power converter assembly can achieve high power efficiency and mechanical robustness within a thin profile compatible with existing printed circuit board and semiconductor packaging processes. The design is particularly suited for use in data centers, artificial intelligence hardware, and other high-performance systems where space efficiency and thermal reliability are of primary importance.

In a second aspect of the present disclosure, a method is disclosed, wherein the method comprises the steps of: providing a bottom structure, a plurality of passive components and at least one routing structure; arranging the at least one routing structure and the plurality of passive components on the bottom structure, thereby providing a first sub-assembly; providing a top structure; arranging the top structure on the plurality of passive components and the at least one routing structure, thereby providing a passive sub-assembly; providing an active sub-assembly comprising at least one integrated circuit; arranging the active sub-assembly on the top structure, thereby providing the stacked power converter assembly.

The disclosed method enables an efficient and scalable manufacturing process for producing compact, high-performance stacked power converter assemblies with vertically integrated passives and actives. By sequentially forming sub-assemblies, the process allows precise alignment between the structures, routing structures, and passive components, ensuring accurate electrical connectivity and mechanical integrity. The use of a bottom structure as the initial foundation provides a stable platform for the placement of passives and routing elements, which can be mounted using automated surface-mount or flip-chip techniques. The subsequent addition of the top structure over the passive components forms a closed stack that encloses the passive components, or passive sub-assembly while maintaining electrical contact through solder joints, conductive adhesives, or compression interconnects.

This manufacturing method can facilitate the integration of multiple functional layers in a controlled manner, reducing assembly complexity and improving yield. By assembling the passive sub-assembly separately from the active sub-assembly, the process allows independent optimization of each part, for example thermal reflow of solder joints for passive components can be performed before sensitive integrated circuits are attached. The active sub-assembly, which may include a silicon-based substrate or interposer carrying one or more integrated circuits, is mounted in the final stage to ensure minimal thermal stress and precise electrical alignment. Such a stepwise approach is compatible with existing semiconductor and PCB fabrication lines, allowing cost-effective implementation without requiring specialized equipment.

The method further provides flexibility for incorporating additional structures, enabling the production of multi-stack power converter assemblies where multiple passive layers, such as first/second sub-assembly within the passive sub-assembly, are connected through vertical interconnects. Each layer can be tested individually before final assembly, improving process control and overall reliability. The resulting stacked power converter assembly benefits from short current paths, reduced parasitic effects, and improved thermal performance, all achieved through a manufacturable and repeatable process. The disclosed method therefore supports high-volume production of compact, thermally efficient power converter modules suitable for a wide range of high-density electronic applications.

In another aspect of the present disclosure, a switched-capacitor DC-DC converter is disclosed, wherein the switched-capacitor DC-DC converter comprises an input terminal, an output terminal, and the stacked power converter assembly as disclosed herein, wherein the input terminal and the output terminal are arranged on the stacked power converter assembly, and wherein the input terminal is configured to provide an input signal, such as an input voltage to the switched-capacitor DC-DC converter and the output terminal is configured to deliver an output signal, such as an output voltage, wherein the output signal is configured to be delivered to a load.

By incorporating the stacked power converter assembly within the switched-capacitor DC-DC converter as disclosed herein, power conversion can be performed with reduced conduction losses and improved transient response. The short current paths between the input and output terminals and the integrated passive components lower equivalent series resistance and inductance, resulting in high efficiency and stable operation at high switching frequencies. The stacked configuration can provide improved thermal conduction paths between the active and passive components. Heat generated by the at least one integrated circuit and the plurality of passive components can be dissipated vertically through the structures, such as the top and bottom structures, and routing structures toward thermally conductive regions or exposed surfaces of the switched-capacitor DC-DC converter. In some embodiments, the inclusion of one or more thermal guides or interposers with high thermal conductivity enables uniform temperature distribution and prevents localized hot spots. As a result, the switched-capacitor DC-DC converter can maintain reliable operation under high current loads while preserving the compact form factor required for advanced electronic systems.

DESCRIPTION OF THE DRAWINGS

In the following, embodiments and examples will be described in greater detail with reference to the accompanying drawings:

FIG. 3A illustrates a centrally arranged routing structure 540, while FIG. 3B illustrates a circumferentially arranged routing structure 540 surrounding the passive components 101.

DETAILED DESCRIPTION

Figure 1:
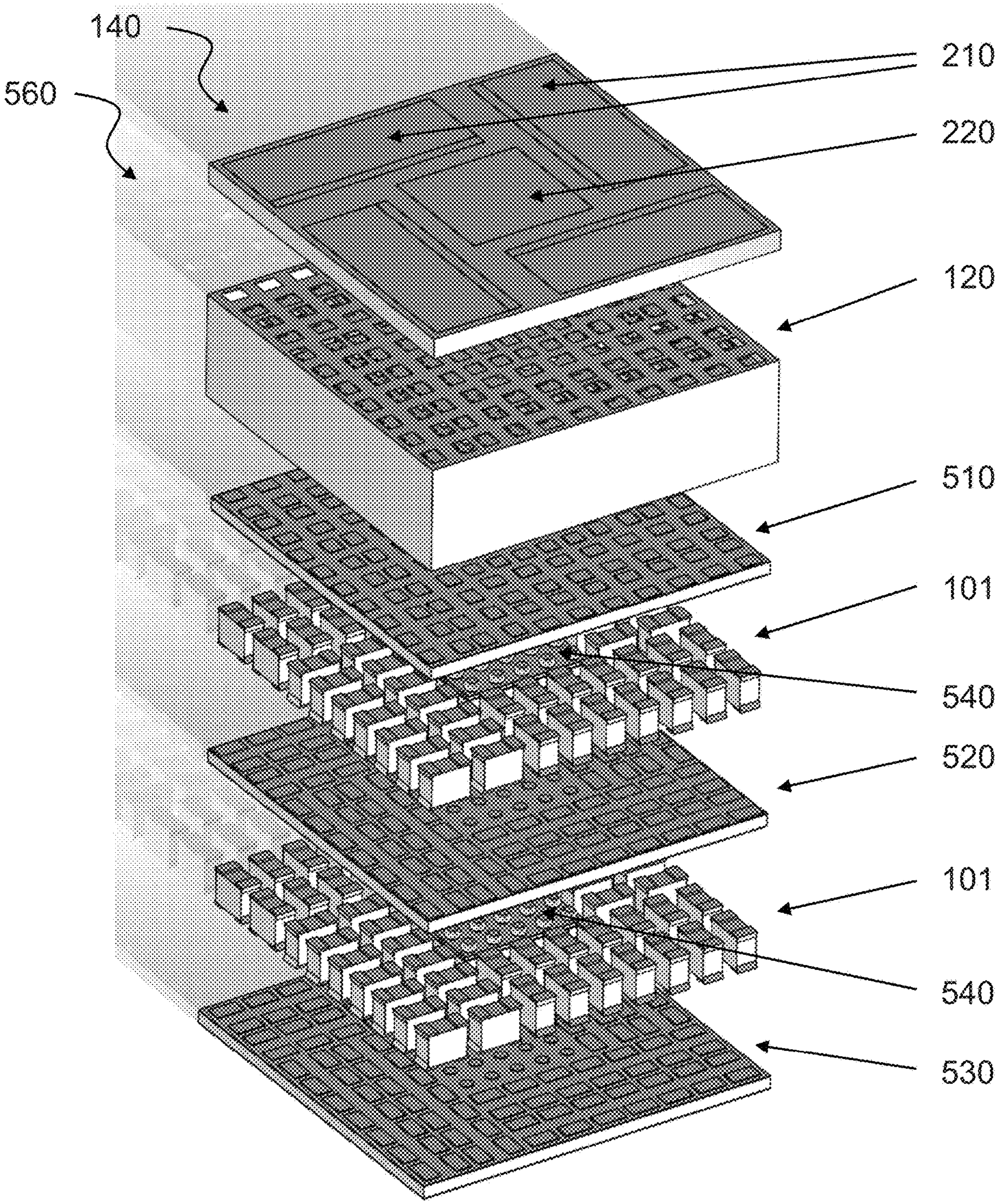
FIG. 1 illustrates an exploded perspective view of an embodiment of the stacked power converter assembly 560 according to the present disclosure, showing the arrangement of the top, middle, and bottom substrates 510, 520, 530, the passive components 101, the routing structures 540, the molding layer 120, and the active sub-assembly 140 comprising the integrated circuit 210 and the thermal guide 220.

In one embodiment of the present disclosure, the plurality of structures are a plurality of substrates, comprising a top and a bottom substrate, such that the bottom structure and the top structure are respectively the bottom substrate and the top substrate. This means that the stacked power converter assembly can be physically defined by a plurality of substrates which face each other and between which the passive components can be accommodated or arranged. The top substrate may carry interconnections for the active sub-assembly or external terminals, whereas the bottom substrate may act as a mechanical carrier and electrical reference plane.

In the present disclosure, the terms "top" and "bottom" are used for ease of description and may equally be understood as "first" and "second". These terms do not necessarily define an absolute physical orientation of the substrates in space. The stacked power converter assembly may be mounted in any direction, and the substrate referred to as the "bottom" substrate may in some cases be positioned above, below, or laterally relative to the substrate referred to as the "top" substrate, depending on the installation. For example, when the stacked power converter assembly is mounted on a wall or on a surface substantially perpendicular to the direction of gravity, the two substrates may occupy the same vertical level or an inverted arrangement relative to the usual orientation. The expressions "top" and "bottom" are therefore intended only to indicate relative positioning within the stack, and should not be interpreted as limiting the disclosure to any particular mounting direction or physical orientation.

The plurality of substrates can be aligned and fixed in position by solder joints, conductive adhesive, or mechanical spacers that define the vertical distance required for the passive components. In practice, the use of a defined top and bottom substrate may provide a rigid enclosure for the plurality of passive components and can allow the overall assembly to be handled as a single component during manufacturing. The advantage of distinguishing the assembly into at least a bottom and a top substrate is that it may create a controlled and reproducible stacking geometry, simplifying electrical routing and heat spreading between the layers.

In another embodiment of the present disclosure, the bottom structure comprises a lead-frame substrate. This means that the bottom structure can be formed by a patterned metal sheet, for example copper or a copper-based alloy, that provides both electrical and thermal conduction. The lead-frame substrate may be stamped or etched to define pads for the passive components, electrical leads for external connection, and optional tie bars that can maintain rigidity before encapsulation. A lead-frame thickness in the range of 100 μm to 750 μm, such as in the range of 200 μm to 600 μm, such as in the range of 300 μm to 600 μm, such as in the range of 400 μm to 600 μm, such as 500 μm, may provide sufficient current-carrying capability while remaining compatible with conventional molding processes. The metal surface of the lead-frame substrate may be plated with nickel, tin, silver, or gold to improve solderability and corrosion resistance. In some implementations, the lead-frame substrate can comprise an exposed central pad that can act as a thermal path to an external heat sink. Advantageously, using a lead-frame as the bottom substrate is that it can offer low electrical resistance and improved thermal conductivity compared with organic laminates, thereby reducing Joule losses and allowing heat generated in the active or passive components to be efficiently dissipated through the bottom of the assembly.

In a preferred embodiment of the present disclosure, the top structure comprises at least one metal clip, wherein the at least one metal clip comprises a top portion arranged on top of the plurality of passive components and at least two parallel legs extending along sides of the plurality of passive components, connecting to the bottom structure. A metallic element, such as the at least one metal clip, can bridge the upper terminals of the plurality of passive components, more generally one surface of the plurality of passive components, while providing lateral legs that reach down to contact the bottom structure. The metal clip may be manufactured from copper, copper alloy, or aluminum and may be plated to prevent oxidation. Its geometry can be tailored so that the top portion exerts uniform pressure or solder contact on the upper surface of the plurality of passive components, while the legs can provide robust electrical and thermal continuity to the bottom structure. In practice, one or more metal clips can be used depending on the number of parallel conduction paths required. The clip not only establishes a direct low-impedance connection between the bottom and top structures but can also act as a heat-spreading element that conducts thermal energy away from the passives and into the lead-frame. The advantage of incorporating a metal clip in this manner is that it can enable high-current operation with minimal inductance and improved thermal management, while mechanically reinforcing the stacked structure and protecting the solder joints from stress during thermal cycling.

The at least one metal clip can also act as the at least one routing structure, since the metal clip can provide the vertical connection between the top and the bottom structures, as described above.

In one embodiment of the present disclosure, the active sub-assembly further comprises an active sub-assembly structure, and the at least one integrated circuit is arranged on the active sub-assembly structure. The active sub-assembly structure may serve as a mechanical and electrical carrier for the at least one integrated circuit, that may form the control or power stages of the stacked power converter assembly. This structure can provide localized routing between the at least one integrated circuit and the passive sub-assembly and may also integrate thermal conduction features such as embedded vias, heat-spreading layers, or exposed metal pads. The at least one integrated circuit can be attached to the active sub-assembly structure by conventional die-attach materials such as solder, epoxy, or silver sinter, depending on the current and thermal requirements. In some configurations, a plurality of integrated circuits can be arranged on the same active sub-assembly structure to realise multi-phase power conversion, voltage regulation, or additional sensing and control functions.

In another embodiment, the active sub-assembly structure comprises an active sub-assembly substrate. The substrate of the active sub-assembly may be fabricated from silicon, organic laminate, ceramic, or metal-core materials, depending on the desired interconnect density and thermal conductivity. When a silicon or glass interposer is used, fine-pitch redistribution layers and through-substrate vias can route signals from the integrated circuit to solder balls or bumps that connect to the underlying plurality of passive components and/or routing structure, or more generally to the passive sub-assembly. An organic or ceramic substrate may include copper planes for power distribution and ground shielding, while also providing mechanical compliance to absorb thermomechanical stress during operation. The active sub-assembly substrate may further include an exposed surface region or thermal interface designed to couple to a heatsink.

In one embodiment of the present disclosure, the plurality of passive components are configured to perform a passive connection between the top and the bottom structures. The passive connection may represent an electrical or a thermal link formed by the plurality of passive components, such as capacitors or inductors, which are arranged between the two structures to provide a defined electrical impedance, energy storage, and/or filtering function. These passive components can interconnect the conductive layers of the top and bottom structures without the need for active control devices, thereby creating a stable and low-loss path for current or voltage transfer. Depending on the desired electrical behaviour, the passive components may be arranged in series, in parallel, or in mixed configurations to tailor overall capacitance, inductance, or more generally, impedance. Such a configuration can promote efficient current sharing and uniform voltage distribution across the stacked structures, such that the plurality of structures, reducing local heating and improving overall electrical stability of the stacked power converter assembly. Such an arrangement can also enhance mechanical integrity, as the passive components act as both electrical, thermal, and/or structural links, reducing the number of separate interconnects needed within the stack.

In a preferred embodiment of the present disclosure, the plurality of passive components comprises a plurality of capacitors and/or a plurality of inductors. These passive components may be positioned to achieve high-density energy storage and filtering within the limited space between the plurality of structures. The capacitors may be selected from multilayer ceramic capacitors, polymer capacitors, or thin-film capacitors, depending on the desired dielectric properties and voltage ratings. Inductors may include wire-wound, multilayer, or thin-film types, with ferrite or magnetic alloy cores chosen for minimal loss at the operating frequency of the converter. The combination of capacitors and inductors can form LC networks that stabilize output voltage and suppress switching noise. By distributing these components throughout the passive sub-assembly, current paths become shorter and parasitic inductance is minimized, leading to faster transient response and reduced voltage ripple. The ability to integrate a plurality of passive components within the same vertical footprint can allow the power converter to achieve high power density and improved overall electrical performance.

In one embodiment of the present disclosure, the plurality of capacitors and/or the plurality of inductors are Surface-Mount Device (SMD) components. SMD components may be mounted directly on conductive pads of the top and bottom structures, enabling compact and reliable assembly using standard surface-mount processes such as reflow soldering. The use of SMD technology can allow high placement accuracy and repeatability, which is advantageous when passive components are to be vertically aligned for direct interconnection between layers. SMD terminations may be plated with tin, nickel, silver, or gold to ensure consistent wetting and to maintain low contact resistance. The availability of SMD passive components in standardized case sizes can simplify design scalability and sourcing. Using SMD passive components in the stacked power converter configuration can also improve manufacturability, as it may avoid the need for through-hole insertion or complex wire bonding, while maintaining strong mechanical bonds that can withstand thermal cycling and vibration. This approach can offer a cost-effective and robust means of realizing dense passive networks, such as the passive sub-assembly, within the three-dimensional stacked power converter assembly.

In another embodiment of the present disclosure, the at least one routing structure is at least one dummy passive component, such as a dummy capacitor and/or a dummy inductor. The dummy passive component may have the same or a similar outer shape, terminal geometry, and placement footprint as a functional passive component, such as the plurality of passive components as described herein, but may not provide any significant electrical capacitance or inductance. It may instead serve as an electrical/thermal or mechanical interconnection element, for example linking conductive regions of adjacent substrates or structures, or maintaining a uniform spacing between the plurality of structures. Using at least one dummy passive component in the stacked power converter assembly, arranged on the plurality of structures and/or as the at least one routing structure can simplify manufacturing, as standard pick-and-place processes can be applied without introducing new component types or special fixtures. In some embodiments, dummy capacitors may be internally shorted to act as low-resistance vertical vias, or may be partially conductive to provide defined resistance for current balancing. The mechanical similarity between dummy and active passives also contributes to uniform stress distribution during solder reflow and encapsulation. Such an arrangement can enable the routing path to be integrated seamlessly within the plurality of passive components defining a specific layout, improving space efficiency and reducing the total number of interconnect parts required in the stacked power converter assembly.

In a preferred embodiment of the present disclosure, the at least one routing structure comprises a plurality of conductive posts, a plurality of conductive pillars, a plurality of wire bonds, or any combination thereof. These routing elements may provide the vertical connection between the top and bottom structures or between intermediate structures comprised within the stacked power converter assembly. Conductive posts or pillars can be made of copper, aluminum, tungsten, or a composite metal, and may be formed by electroplating, solder bumping, or additive manufacturing. Their height and diameter may be selected to achieve the desired mechanical stiffness and electrical conductivity, and they can be arranged in arrays or patterns to distribute current evenly across the at least one routing structure, more generally across the stacked power converter assembly, in between the plurality of structures. Wire bonds may be employed when flexibility or compliance can be required, and can comprise single or multiple wires per connection, made of gold, copper, or aluminum. A combination of posts, pillars, and wire bonds may be used to balance electrical performance, mechanical strength, and manufacturing cost. These vertical conductors enable efficient current flow between the plurality of structures, shorten the electrical path length, and provide parallel thermal conduction routes for heat dissipation. By offering different connection technologies within the same concept, the at least one routing structure can be adapted to various design requirements, packaging types, and assembly processes while maintaining compactness and high reliability.

In one embodiment of the present disclosure, the at least one routing structure is centrally arranged, such that the at least one routing structure is substantially arranged in the middle of the plurality of structures, and is surrounded by the plurality of passive components. The term "centrally arranged" may be understood as meaning that the routing structure is positioned near the geometric center of the stacked power converter assembly when viewed from above, typically within a tolerance of about 5 to 15% of the overall lateral dimension from the center point. Such positioning can allow the routing structure to act as a central hub for distributing current or signals vertically through the stack, thereby minimizing the length of lateral interconnections to each passive component. The passive components may be symmetrically distributed around the at least one routing structure, forming a balanced layout that can reduce current crowding and magnetic coupling between adjacent passive components. In some configurations, the at least one routing structure may serve as a common power or ground node, enabling uniform potential distribution across the stacked power converter assembly. The central placement can also promote even mechanical stress distribution during thermal cycling and encapsulation, improving long-term reliability of the stacked power converter assembly.

In another embodiment of the present disclosure, the at least one routing structure is circumferentially arranged, such that the at least one routing structure is substantially arranged at the circumference of the plurality of structures, and surrounds the plurality of passive components. In this context, "circumferentially arranged" refers to routing elements located near the periphery of the stacked power converter assembly, for instance within a region extending from about 80% to 100% of the radial distance from the center of the stacked power converter assembly. The circumferential configuration may include one or more continuous or segmented routing paths that encircle the passive components, providing additional current return paths or signal routing channels along the outer boundary. Such a design may improve electromagnetic compatibility by confining high-frequency currents near the edges of the module, reducing crosstalk and interference with central circuitry. Circumferential routing may also provide enhanced heat spreading, as peripheral routing structures can act as thermal frames conducting heat laterally outward toward exposed surfaces or heat sinks.

It is noted that the routing structure may be arranged both centrally and circumferentially within the stacked power converter assembly. A combined configuration may include a central routing core complemented by one or more peripheral routing paths, forming a distributed vertical interconnect system that may support both high-current delivery and efficient signal separation. This hybrid layout can provide flexibility in circuit design, allowing different functional domains, such as power, ground, and control, to be routed independently while maintaining compactness and symmetry. The expressions "centrally arranged" and "circumferentially arranged" should therefore be interpreted broadly to encompass arrangements that can deviate from the exact geometric center or periphery by a practical tolerance, for example within ±10% of the total footprint dimensions, as dictated by the stacked power converter assembly process or electrical design constraints.

In a preferred embodiment of the present disclosure, the at least one routing structure comprises solder balls arranged on a top and/or a bottom surface of the at least one routing structure. The solder balls may provide mechanical attachment and electrical connection between the routing structure and adjacent structures or passive components within the stacked power converter assembly. Each solder ball may be formed of a tin-based alloy, such as SnAgCu or SnPb, although other compositions may be used depending on reliability and process considerations. The diameter of the solder balls may range, for example, from 50 μm to 500 μm depending on current requirements and assembly tolerances. The array of solder balls can be arranged in a grid, a ring, or any pattern suited to the circuit layout, with pitch and spacing optimized to balance electrical performance and manufacturability. During assembly, the solder balls may reflow to create uniform joints, ensuring both mechanical stability and low-resistance electrical contact. In some cases, underfill or adhesive materials may be dispensed around the joints to enhance fatigue resistance during thermal cycling. The advantage of using solder balls on the routing structure is that they enable reliable vertical interconnection while allowing compliance to absorb differential thermal expansion between dissimilar materials, maintaining long-term integrity of the stacked converter module.

In another embodiment of the present disclosure, the at least one routing structure comprises one or more pads arranged on a top and/or a bottom surface of the at least one routing structure. The pads may serve as electrical terminals or landing areas for subsequent attachment of solder, wire bonds, or conductive adhesive. These pads may be made of copper, nickel, gold, silver, or multilayer metallization stacks, optionally with protective or wettable finishes such as electroless nickel immersion gold (ENIG), immersion silver, or organic solderability preservative coatings. Pad shapes may include circular, rectangular, or polygonal geometries depending on the alignment and bonding process, and may be distributed in a matrix or peripheral configuration corresponding to the underlying circuitry. In some embodiments, the one or more pads on the top and bottom surfaces may be vertically aligned to form through connections when joined by vias or solder balls.

In one embodiment of the present disclosure, the at least one routing structure comprises at least one routing substrate. The at least one routing substrate may serve as an intermediate layer that electrically and mechanically couples the top and bottom structures, or any structures of the plurality of structures, within the stacked power converter assembly. It may comprise conductive traces, vias, or redistribution layers configured to direct current and signals through the module in a compact three-dimensional configuration. The routing substrate can also provide structural rigidity to the stacked power converter assembly and may act as a heat-spreading layer between the passive components and the active sub-assembly. The inclusion of a routing substrate offers flexibility in circuit design, as different routing layers can be dedicated to power, ground, or control functions. Its thickness and material composition may be selected to optimize electrical impedance, dielectric strength, and thermal conductivity, while ensuring mechanical compatibility with the structures it may join.

In another embodiment of the present disclosure, the at least one routing substrate comprises at least one routing through-substrate via, wherein the at least one routing through-substrate via is configured to provide the vertical connection between the plurality of structures. A through-substrate via may extend through the full thickness of the at least one routing substrate and be filled or plated with a conductive material such as copper, tungsten, or aluminum. The through-substrate via may be formed by mechanical drilling, laser ablation, or deep reactive ion etching depending on the substrate type. It may have a diameter ranging from a few micrometers to several hundred micrometers and may be lined with an insulating barrier when isolation from the substrate material is required. The through-substrate via enables direct vertical conduction between both sides of the at least one routing structure, significantly reducing the resistance and inductance of the interconnection compared with surface routing. The arrangement of multiple through-substrate vias may be tailored to equalize current density and to support uniform thermal conduction through the stacked power converter assembly. By enabling dense vertical routing, the at least one routing substrate with through-substrate vias allows compact stacking while improving electrical and/or thermal performance.

In a preferred embodiment of the present disclosure, the at least one routing substrate comprises at least one interposer, such as at least one silicon substrate. The interposer may function as a fine-pitch routing layer that redistributes electrical connections between the plurality of structures or between the structures and the active sub-assembly. When formed from silicon, the interposer can comprise through-silicon vias and/or redistribution layers that provide short, low-impedance interconnections. Other materials such as glass, ceramic, or organic laminate may also be used for the interposer depending on the desired dielectric constant, coefficient of thermal expansion, or cost. The interposer may additionally include metallized pads for solder ball attachment or wire bonding, and its surfaces may be treated to enhance solderability or adhesion to encapsulant materials. Using an interposer as part of the routing substrate enables high interconnect density and precise alignment, which can be particularly advantageous in miniaturized high-frequency converters where parasitics must be minimized. The interposer may also serve as a thermal interface layer, conducting heat from the active sub-assembly and/or the plurality of passive components to the surrounding structures while maintaining electrical isolation where required.

In one embodiment of the present disclosure, the at least one routing substrate comprises an organic substrate, preferably a PCB substrate, a ceramic substrate, preferably an alumina, aluminum nitride or silicon nitride substrate, a metal substrate, preferably a lead-frame substrate such as a copper lead-frame substrate, a glass substrate and/or a silicon substrate. Each material type can offer distinct electrical, thermal, and mechanical properties. Organic or PCB substrates can provide low cost and high design flexibility with multiple copper layers separated by dielectric films. Ceramic substrates, such as alumina or aluminum nitride, offer superior thermal conductivity and dimensional stability, making them well-suited for high-power or high-temperature environments. Metal substrates, for instance copper lead frames, combine high current-carrying capability with excellent heat dissipation and mechanical robustness. Glass substrates may provide low dielectric loss and a smooth surface finish for fine-feature routing, while silicon substrates can allow integration of through-silicon vias and high-density interconnects.

In a preferred embodiment of the present disclosure, the top and/or the bottom structure respectively comprises a top and/or a bottom redistribution layer. A redistribution layer may provide localized routing to terminals of the passive components, the at least one routing structure, or active sub-assembly. It may consist of patterned metal traces embedded in or deposited on a dielectric layer, such as polyimide or epoxy resin. The top and/or bottom redistribution layer can redirect signals and power lines from densely packed component terminals to larger pads or external connections, improving manufacturability and inspection access. In some configurations, the redistribution layer may also serve as a shielding or ground plane, thereby reducing electromagnetic interference between high-frequency switching nodes and sensitive control circuits. The thickness and material composition of the redistribution layer may be optimized for the specific current density and voltage isolation requirements of the converter.

In one embodiment of the present disclosure, the plurality of substrates and/or the active sub-assembly substrate comprises an organic substrate, preferably a PCB substrate, a ceramic substrate, preferably an alumina, aluminum nitride or silicon nitride substrate, a metal substrate, preferably a lead-frame substrate such as a copper lead-frame substrate, a glass substrate and/or a silicon substrate. The listed materials may be selected individually or in combination to meet the electrical, mechanical, and thermal requirements of the stacked power converter assembly. An organic substrate, for example FR-4, BT resin, or ABF laminate, can provide good dielectric strength and mechanical compliance at low cost. Ceramic substrates such as alumina or aluminum nitride may be chosen for their high thermal conductivity and dimensional stability, beneficial for power-dense assemblies. Metal substrates, including copper lead frames, can conduct heat efficiently and serve as both an electrical and mechanical support. Glass substrates may offer low dielectric loss for high-frequency operation, while silicon substrates can enable fine routing features, through-silicon vias, and compatibility with wafer-level processes, as well as enhanced thermal conduction.

In another embodiment of the present disclosure, the passive sub-assembly and/or the active sub-assembly is configured to be encapsulated, preferably in a first molding material. The encapsulation may provide mechanical protection and environmental sealing for the internal components, such as the passive components, the plurality of structures, and/or the active sub-assembly, shielding them from moisture, dust, and mechanical impact. The first molding material can be one or a combination of suitable molding materials comprising epoxy resins, silicone compounds, or thermoplastic encapsulants with tailored thermal expansion coefficients to match the substrates. Encapsulation may be performed by transfer molding, compression molding, or liquid encapsulation techniques, depending on the production scale and design geometry. The first molding material may also serve as a thermal interface medium, conducting heat away from the passives and active components toward exposed metal regions or heat sinks. In addition to mechanical robustness, the encapsulation can improve electrical insulation between adjacent conductive parts and prevent short circuits caused by solder flux residues or contamination. The thickness of the encapsulant layer and its filler content can be adjusted to achieve the desired balance between protection, heat conduction, and weight.

In one embodiment of the present disclosure, the passive sub-assembly further comprises a middle structure arranged between the top and the bottom structure. The inclusion of a middle structure provides an additional level within the stacked power converter assembly, allowing further distribution of passive components, routing layers, or thermal paths. This intermediate layer can serve as both an electrical bridge and a thermal conduit between the top and bottom structures of the stacked power converter assembly. The middle structure may be mechanically coupled to the top and bottom structures using solder joints, conductive adhesives, or compression interconnects, ensuring both electrical continuity and mechanical stability. The spacing between the structures may be precisely defined to maintain uniform stress distribution across the stack.

In some embodiments, the middle structure may comprise at least one or all of the features described for the top and/or bottom structures. The middle structure may therefore be implemented using the same materials and layer configurations as the outer structures, such as organic laminates, ceramic materials, silicon, metal lead frames, or glass substrates. It may comprise similar functional elements, for instance redistribution layers, through-substrate vias, solder pads, and routing or thermal structures corresponding to those provided in the top and bottom structures. In this way, the middle structure can perform the same electrical, mechanical, and thermal functions as the other structures, forming a uniform and repeatable building block within the stacked power converter assembly.

In further embodiments, the middle structure may replicate the conductive and dielectric layering of the top or bottom structure to maintain consistent electrical impedance and thermal expansion properties throughout the stacked power converter assembly. This approach can simplify manufacturing, as identical or compatible substrate designs can be reused for multiple layers, and allows the stacked power converter assembly to be scaled by simply adding or removing intermediate structures. The use of similar materials and configurations across all structures may ensure mechanical symmetry, reliable vertical alignment, and uniform heat spreading within the stacked power converter assembly.

In another embodiment of the present disclosure, the plurality of passive components is further arranged on the middle structure. The passive components on the middle structure may be aligned with corresponding components on the top or bottom structures to create vertically stacked arrays, enabling direct electrical interconnection through vias, posts, or pillars. This arrangement allows multiple passive layers to function cooperatively, providing increased energy storage or filtering capability within the same planar area. The middle structure can host capacitors, inductors, or other passive elements or components arranged in identical or complementary patterns to those on adjacent structures, ensuring balanced current distribution and predictable electrical performance. The vertical stacking of passive components across multiple structures reduces overall loop inductance and resistance, improving transient response and efficiency. Moreover, locating passive components on the middle structure enhances three-dimensional thermal spreading, as heat generated within inner structures, such as the middle structure can be transferred upward and downward through the adjoining structures, such as the top and/or bottom structures.

In a preferred embodiment of the present disclosure, the middle structure comprises a middle substrate. The middle substrate may be fabricated from similar or different materials compared to the top and bottom substrates, such as organic laminates, ceramics, silicon, or metal-based substrates. It may incorporate vias, conductive layers, or interconnect pads to facilitate signal and power routing through the vertical stack of the stacked power converter assembly. The thickness and material composition of the middle substrate may be chosen to optimize mechanical stiffness and to match the thermal expansion of the adjoining layers. The use of a middle substrate allows the stacked power converter assembly to be extended to three or more substrate layers while maintaining a consistent manufacturing process, thereby supporting scalable designs and increased functionality without introducing significant complexity.

In one embodiment of the present disclosure, the middle substrate comprises at least one or a combination of the features of the top and/or bottom substrate as described and disclosed herein. The middle substrate may therefore comprise redistribution layers, through-substrate vias, or embedded routing structures similar to those of the top and/or bottom substrates, or may integrate lead-frame sections, metal clips, or interposers depending on the electrical and thermal requirements. This approach can allow the middle substrate to act as a functional extension of either the top or bottom substrate, maintaining electrical symmetry and simplifying manufacturing logistics by reusing existing substrate designs.

In one embodiment of the present disclosure, the top, middle, and/or bottom substrate comprises at least one through-substrate via. A through-substrate via may extend from one surface of the substrate to the opposite surface, forming an electrical and/or thermal pathway between the two sides, such as the one surface and the opposite surface. The through-substrate via may be implemented as a plated or filled opening containing a conductive material such as copper, aluminum, or tungsten, optionally lined with an insulating layer if the substrate itself is conductive. The geometry of the through-substrate via, including its diameter and aspect ratio, may be optimized to achieve low resistance and inductance while preserving mechanical strength. Through-substrate vias can be arranged individually or in arrays to accommodate current-carrying requirements or to distribute heat evenly through the stacked power converter assembly.

In another embodiment of the present disclosure, the plurality of passive components are arranged on the top, middle, and/or bottom structure in vertical alignment, such that corresponding terminals of the plurality of passive components are aligned along a common vertical axis and can be configured to be directly electrically connected. The term "vertical alignment" may be understood to mean that each passive component on one structure is positioned substantially above or below a corresponding component on another structure within a tolerance of approximately ±10% of the component's lateral dimension. This alignment allows direct interconnection between the components using vertical conductive features, such as vias, posts, or pillars, thereby minimizing the need for lateral routing. Vertically aligned passive components may form parallel or series connections, depending on circuit design, enabling high-capacitance or high-current configurations within a compact footprint. Aligning passive components along a common axis also leads to symmetrical current flow and predictable electromagnetic fields, improving electrical performance and reducing noise coupling between adjacent paths.

In some embodiments, the passive and/or electrical connection between the top and bottom structures may be realized directly through the terminals of the passive components. Each passive component may comprise upper and lower terminals or left and right terminals, that are respectively bonded to conductive pads or any other connections on the opposing structures, such that the passive component itself forms a direct electrical bridge between the two structures. In this configuration, current can flow vertically through the stack via the passive terminals, thereby potentially eliminating intermediate routing layers, interposers and/or routing structures. This arrangement can allow the passive components to act simultaneously as circuit elements and as interconnect structures, reducing overall path length and improving electrical efficiency. The terminals may be joined to the structures by solder joints, conductive adhesive, or pressure contacts, and may cooperate with, for instance, through-substrate vias or pillars to form composite electrical paths extending through the stacked power converter assembly.

In one embodiment of the present disclosure, the plurality of passive components are directly electrically connected through the at least one through-substrate via. In this configuration, each through-substrate via may contact the terminal metallization of a passive component on one side of the substrate and continue vertically to the terminal of a corresponding passive component on the opposite side. The direct electrical and/or thermal connection through the substrate can eliminate intermediate routing layers, minimizing series resistance and parasitic inductance. The connection may be realized by filling the via with conductive material or by using plated through-holes that are subsequently soldered or bonded to the component terminals. Such direct interconnection improves energy transfer efficiency and reduces signal delay in fast-switching converters. From a manufacturing perspective, the approach also simplifies assembly alignment, as the via positions can be matched precisely to passive and/or active component pads using standard PCB or semiconductor fabrication techniques.

In a preferred embodiment of the present disclosure, the plurality of passive components are arranged on the middle and the bottom substrate, wherein the plurality of passive components are positioned substantially on top of each other such that the plurality of terminals are aligned in a vertical direction. This configuration can establish a repeating stack of components between the two substrates, effectively creating vertical arrays of passives. The expression "substantially on top of each other" may encompass minor lateral offsets due to placement tolerances or assembly variations, for example within ±5% of the component footprint size, which may be sufficient to maintain electrical overlap between corresponding terminals. Such alignment can enable direct vertical interconnection, either by solder joints, conductive pillars, or vias extending through the substrate, such as the through-substrate vias as described herein. Positioning components, such as passive and/or active components, in this manner may ensure that the electric field distribution and current flow can remain uniform throughout the stacked power converter assembly, reducing uneven heating and promoting balanced electrical operation.

In another embodiment of the present disclosure, the plurality of passive components are arranged on a bottom structure according to a first layout, and the passive components on a top and/or middle structure are arranged according to the same first layout, such that the passive components on the different structures are positioned in vertical alignment. The term "first layout" may refer to a predetermined geometric arrangement of component positions, such as a grid, array, or radial pattern defined by the circuit design. Replicating this layout on successive substrates ensures that each passive component on one layer, such as one substrate of the plurality of substrates/structures, is vertically aligned with its counterpart on another layer, such as another substrate of the plurality of substrates/structures. This embodiment may simplify design scaling, as only one layout template can be defined and reused for each substrate. Maintaining a consistent layout across the stacked power converter assembly can support predictable electrical connectivity and may allow automated assembly processes with optical alignment systems.

In one embodiment of the present disclosure, the active sub-assembly and/or the passive sub-assembly comprises one or more thermal guides. The thermal guides may form dedicated structures that promote heat transfer from regions of high thermal generation, such as semiconductor dies or dense passive networks, to cooler regions or external heat sinks. These guides may be implemented as solid or composite elements made from thermally conductive materials such as copper, aluminum, silicon, graphite, or thermally enhanced polymer composites. Their geometry can vary depending on the spatial constraints of the assembly and may include plates, pillars, vias, or embedded heat spreaders integrated within the substrates. Incorporating thermal guides into either or both sub-assemblies can reduce thermal resistance across the stack and may improve temperature uniformity. The integration of such thermal guides can allow the stacked converter to operate reliably at higher power levels without requiring external cooling solutions that would increase size and complexity.

In another embodiment of the present disclosure, the one or more thermal guides are configured to conduct heat between a first area and a second area. The first area may correspond to a heat-generating region, such as the active sub-assembly, the at least one routing structure, or the center of the passive sub-assembly, whereas the second area may represent a thermal interface coupled to a housing, heat sink, another stacked thermal guide or ambient environment. The thermal guide may thus provide a continuous path for thermal conduction, directing heat through the thickness of the stacked power converter assembly or laterally across its surfaces. The positioning and dimensions of the thermal guide may be chosen to optimize the temperature gradient and to avoid hotspots. Depending on the thermal load, multiple thermal guides may be arranged in parallel or in series to share heat flux uniformly. The controlled conduction between the first and second areas can lead to improved reliability by keeping junction temperatures within safe operating limits and by preventing thermal stress on solder joints and encapsulated materials.

In a preferred embodiment of the present disclosure, the one or more thermal guides further comprise a fourth silicon substrate portion, a third portion, wherein the third portion is at least one layer of an electrically isolative portion deposited on the fourth silicon substrate portion, and at least two first portions, wherein the at least two first portions are electrically conductive connector portions connectable to the first area and the second area and deposited on the third portion. The one or more thermal guides may be configured to transfer a principal portion of heat from the first area through the third portion to the fourth silicon substrate portion, further through the fourth silicon substrate portion to the second area via the third portion. The third portion may form an electrical barrier that can isolate the at least two first portions and the fourth silicon substrate portion from each other. In this configuration, the thermal guide combines electrical isolation with high thermal conductivity, allowing the transfer of heat without creating unintended electrical pathways. The isolative layer can be formed of silicon dioxide, aluminum oxide, or other dielectric materials deposited by chemical vapor deposition, atomic layer deposition, or sputtering. The conductive connector portions may be formed of copper, nickel, or aluminum, patterned on the isolative layer to match the contact pads of the heat source and sink. Such a multilayer thermal guide design can allow high thermal performance within a compact footprint and can be integrated directly into silicon-based sub-assemblies using established semiconductor processing techniques.

In one embodiment of the present disclosure, the one or more thermal guides further comprise a second portion, wherein the second portion is thermally conductive and non-electrically conductive, and wherein the second portion is deposited between the at least two first portions and the third portion. The second portion may consist of a dielectric material filled with thermally conductive particles such as aluminum nitride, boron nitride, or diamond, providing enhanced heat transfer while maintaining electrical isolation. The inclusion of this second portion allows fine tuning of the thermal resistance and electrical insulation properties of the thermal guide. By interposing the second portion between the conductive and isolative layers, heat spreading can be improved and mechanical stresses caused by coefficient-of-thermal-expansion mismatches can be mitigated.

In another embodiment of the present disclosure, the one or more thermal guides are arranged in the active sub-assembly such that the one or more thermal guides are vertically aligned with the at least one routing structure. Aligning thermal guides with the routing structure can allow heat to be removed along the same vertical axis as the electrical conduction paths, thereby minimizing thermal gradients across the stacked power converter assembly. Such vertical alignment ensures that the areas of highest current density, which often correspond to elevated heat generation, have a direct thermal evacuation route through the thermal guides to the outer surfaces or to external heat sinks. Moreover, the at least one routing structure may comprise at least one routing substrate, preferably implemented as an interposer, which can also contribute to improved thermal dissipation. When the routing substrate is formed as a silicon interposer, its intrinsic thermal conductivity facilitates efficient heat transfer through the routing structure toward the thermal guide(s). The alignment tolerance may be within about ±10% of the routing structure footprint to maintain efficient coupling between electrical and thermal pathways.

In one embodiment of the present disclosure, the one or more thermal guides are configured to be connected to the at least one routing structure. The thermal guide may physically and thermally interface with the routing structure through solder joints, thermal interface materials, or direct metallurgical bonding. This connection can enable dual functionality of the routing structure, allowing it to conduct both electrical current and heat. The shared path reduces the number of separate components dedicated to thermal management and contributes to a thinner, more integrated design. By coupling the thermal guides to the routing structure, heat can be dissipated efficiently through the same metallic pathways that carry current, achieving synergistic electrical and thermal performance.

In another embodiment of the present disclosure, the vertical connection and/or the passive connection is a thermal and/or an electrical connection. This means that the structures connecting the stacked substrates/structures or passive components may conduct both heat and electrical current, depending on their composition and configuration. A vertical interconnect formed of metallic materials such as copper, aluminum, or tungsten can simultaneously provide an electrical pathway and a thermal conduit. In some embodiments, dedicated elements may be designed to perform only one of these functions, for instance, an electrically isolated but thermally conductive via filled with dielectric material containing ceramic or metal-oxide particles. The ability for certain connections to carry both thermal and electrical energy improves the efficiency of the stacked power converter assembly by shortening heat evacuation paths and reducing the number of distinct interconnect features.

In a preferred embodiment of the present disclosure, the top surface of the active sub-assembly comprises at least one active sub-assembly pad. The pad may act as an interface for electrical or thermal contact between the active sub-assembly and external elements such as additional circuitry, heat spreaders, or ground connections. The pad can be realized as a metallized region deposited or patterned on the uppermost layer of the active sub-assembly substrate, using materials such as copper, nickel, gold, or silver. The surface finish of the pad may be adapted for the chosen interconnection method, for example soldering, wire bonding, or conductive adhesive attachment. The size and position of the pad can be selected to provide low impedance for electrical signals or to maximize the contact area for efficient thermal transfer. Integrating at least one active sub-assembly pad on the top surface of the active sub-assembly can ensure that the active sub-assembly can be conveniently connected to other system components or grounding planes during assembly.

In one embodiment of the present disclosure, the at least one active sub-assembly pad is configured to be connected to a ground, preferably an electrical ground. The ground connection may provide a stable reference potential for the integrated circuit, minimizing voltage fluctuations and electromagnetic noise. When the at least one active sub-assembly pad is connected to an electrical ground, it can serve as a low-impedance return path for high-frequency switching currents, improving signal integrity and reducing susceptibility to interference. The at least one active sub-assembly pad may also form part of a grounding network that can extend through the at least one routing structure and into the bottom structure, such as a lead-frame or metal base of the stacked power converter assembly. In addition to electrical grounding, the at least one active sub-assembly pad can act as a thermal ground, facilitating heat dissipation through metallic pathways into the surrounding packaging or heat sink. Providing a well-defined grounding pad in this way enhances both the electrical performance and thermal management of the stacked power converter assembly.

In a preferred embodiment of the present disclosure, the at least one integrated circuit is configured to perform a power conversion together with the plurality of passive components, preferably a switched-capacitor DC-DC power conversion together with the plurality of passive components. The at least one integrated circuit may comprise power transistors, control logic, and gate drivers that cooperate with the capacitors and inductors to achieve regulated voltage conversion. In a switched-capacitor topology, the at least one integrated circuit may alternate connections between the capacitors to transfer charge efficiently, providing voltage step-up or step-down functionality with minimal magnetic components. The control circuitry within the integrated circuit may adjust the switching frequency, duty cycle, or phase to maintain the desired output voltage across varying load conditions. Combining the active sub-assembly and the passive sub-assembly with vertically aligned passive components in a single stacked assembly reduces parasitic inductance and resistance, improving transient response and conversion efficiency.

In one embodiment of the present disclosure, the stacked power converter assembly is configured to be encapsulated in a molded package, such that the molded package forms a microelectronic package selected from the list of: land grid array (LGA), quad flat no-lead (QFN), or embedded passive laminate package. The molded package provides environmental and mechanical protection to the internal components while creating a standardized external interface for mounting onto larger systems. In an LGA configuration, external electrical contacts may be defined as flat pads on the package underside, allowing low-profile surface mounting with good thermal contact to the underlying board. A QFN configuration may include exposed metal pads that serve as both electrical and thermal connection points, enhancing heat dissipation from the lead-frame substrate. An embedded passive laminate package may integrate the passives directly within laminated dielectric layers, offering a thin and compact solution for high-frequency applications. The molded package can be fabricated using epoxy-based or thermoplastic materials compatible with transfer molding or compression molding processes.

FIG. 1 shows an exploded view of an embodiment of the stacked power converter assembly 560. In this specific embodiment, the assembly comprises a plurality of structures, preferably substrates, including a top substrate 510, a middle substrate 520, and a bottom substrate 530, which together define the different structures of the stacked power converter assembly 560. Between these structures/substrates, a plurality of passive components 101 are arranged in vertical alignment, forming a passive sub-assembly together with the structures/substrates 510 520 530. The passive components 101 may include capacitors, inductors, or a combination thereof, configured to provide for instance energy storage and filtering. Routing structures 540 are positioned between the substrates 510, 520, 530 and the passive components 101, providing vertical electrical and thermal interconnections throughout the stacked power converter assembly. The routing structures 540 may include conductive pillars, solder balls, or vias that facilitate current transfer and heat conduction between the different structures/substrates. The configuration can allow short electrical paths and uniform current distribution through the stacked power converter assembly. This embodiment of the stacked power converter assembly further comprises an active sub-assembly 140 arranged on the uppermost surface of the passive sub-assembly. The active sub-assembly 140 comprises an integrated circuit 210 and one or more thermal guides 220. The integrated circuit 210 is configured to perform power conversion together with the underlying passive components 101. The thermal guides 220 extend through or within the active sub-assembly 140 to promote heat dissipation from the integrated circuit 210 and/or from the routing structures 540, toward the exterior of the stacked power converter assembly 560, enhancing thermal reliability. A molding layer 120 may be applied over the passive sub-assembly, encapsulating the passive sub-assembly to form a molded passive sub-assembly. The molding 120 provides mechanical stability, electrical insulation, and environmental protection. The top and bottom substrates 510, 530 may each include solder pads, that enable electrical interconnection to other circuit elements.

Figure 2:
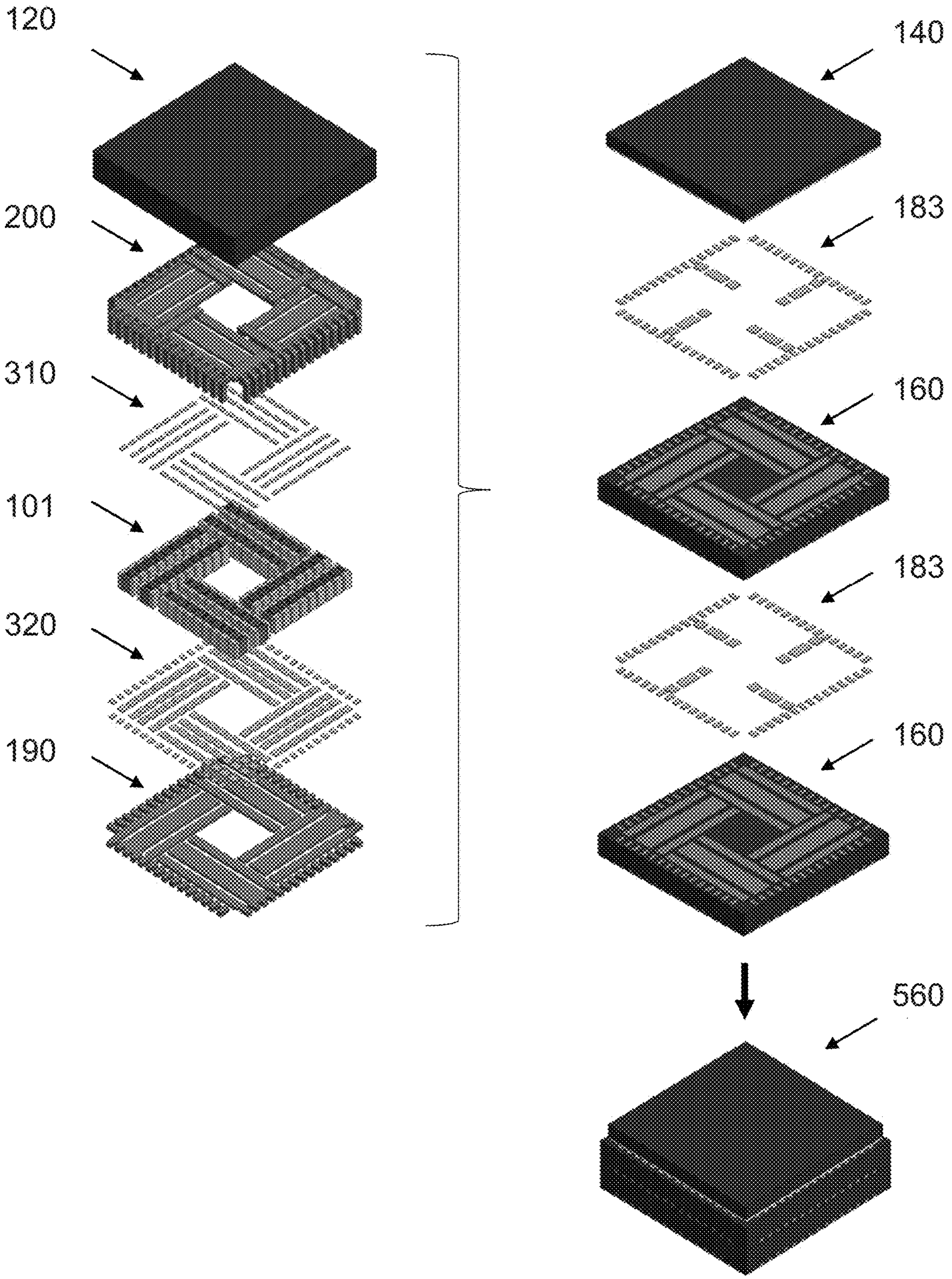
FIG. 2 illustrates an exploded perspective view of an embodiment of a stacked power converter assembly 560, comprising a stack of encapsulated passive sub-assemblies 160, comprising a lead-frame substrate 190, a plurality of passive components 101, top and bottom solder pads 310, 320, and metal clips 200, as well as the corresponding molding layer 120 and molded active sub-assembly 140.

FIG. 2 shows an exploded perspective view of an embodiment of a stacked power converter assembly 560, comprising a stack of passive sub-assemblies 181, comprising a lead-frame substrate 190, a plurality of passive components 101, top and bottom solder pads 310, 320, and metal clips 200, as well as the corresponding molding layer 120 and molded active sub-assembly 140. The passive sub-assembly includes a lead-frame substrate 190 forming the bottom structure, a plurality of passive components 101 arranged above the lead-frame substrate, and metal clips 200 serving as the top conductive connection. The passive components 101 may comprise capacitors or inductors mounted between the top and bottom solder pads 310 and 320, which provide a suitable electrical connection between the passive components and the adjacent conductive structures. The lead-frame substrate 190 may be formed from a patterned metallic sheet, typically copper or a copper alloy, which acts as both an electrical interconnect and a thermal path for dissipating heat from the passive components. The metal clips 200 are positioned on top of the passive components 101, each clip comprising a flat top portion and downwardly extending legs that connect to the lead-frame substrate 190. The clips 200 provide a robust electrical and mechanical link between the passives and the bottom substrate, while simultaneously acting as heat spreaders that transfer heat toward the upper molding layer 120. The legs of the clips provide in this specific embodiment the routing structure for routing signals between the plurality of structures of the stacked power converter assembly. The solder pads 310 and 320 are arranged on the opposing surfaces of the passive sub-assembly 181 and provide defined contact points for joining the top and bottom conductive structures. During assembly, solder paste or solder balls may be applied to these pads to form electrical joints through standard reflow processing. A molding layer 120 is shown positioned above the top conductive structure to form a molded passive sub-assembly 160, providing mechanical encapsulation and environmental protection. The molding material may be an epoxy-based compound with suitable thermal conductivity and dielectric strength. The encapsulated sub-assembly may subsequently be joined with a stack of the molded passive sub-assemblies 160, which comprise the integrated circuit and associated interconnections. The combined assembly forms an embodiment of the stacked power converter assembly 560. The electrical connections can also be established through the terminals of the passive components.

Figure 3A:
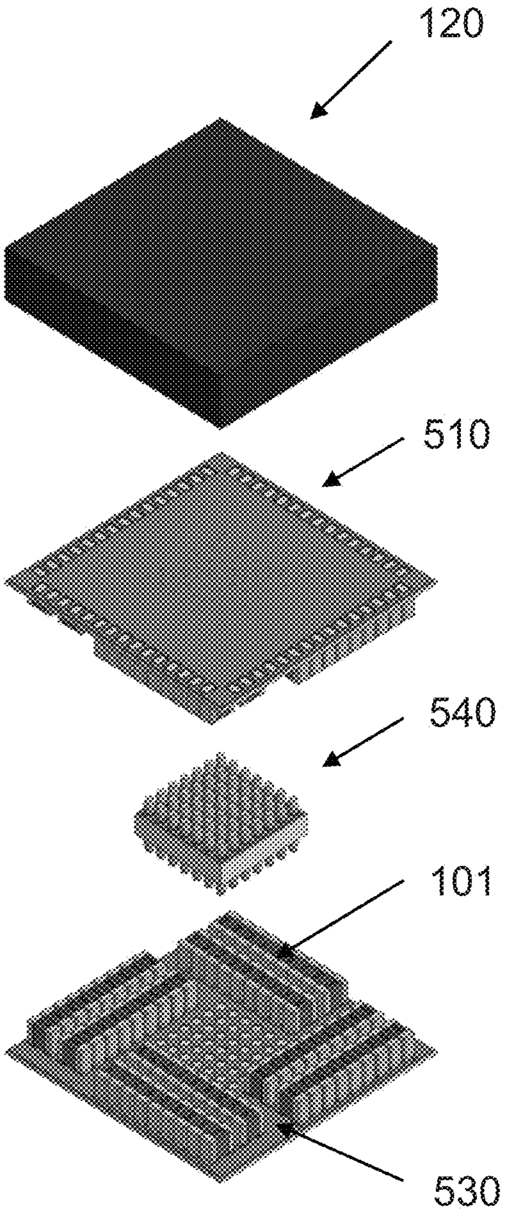
FIGS. 3A-B illustrate exploded perspective views of two embodiments of the stacked power converter assembly, showing examples of different configurations of the routing structure 540 relative to the passive components 101.
Figure 3B:
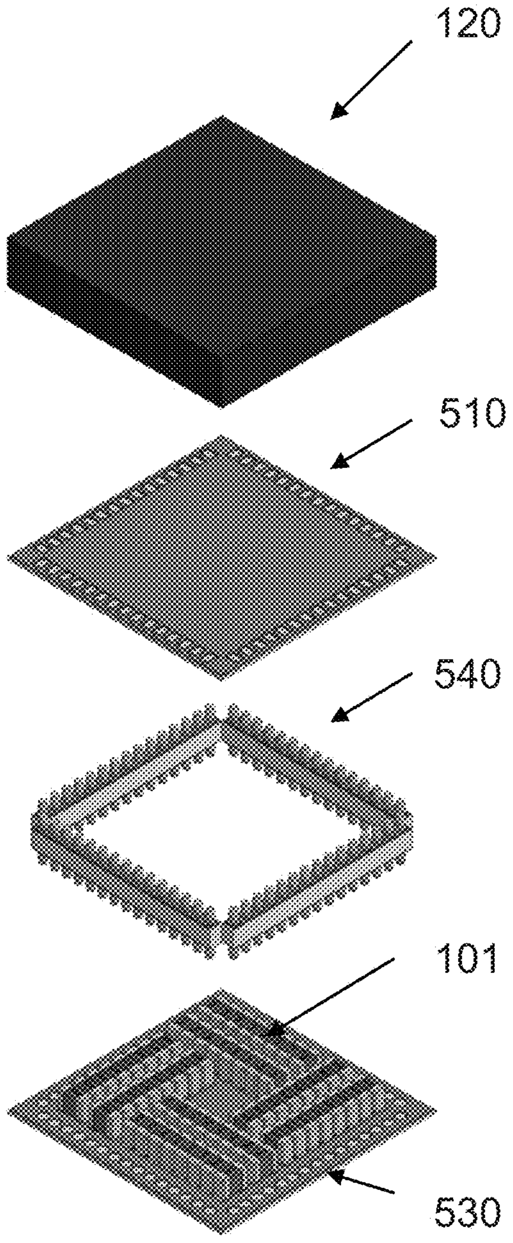

FIGS. 3A-B show two alternative embodiments of the stacked power converter assembly, each comprising a bottom substrate 530, a top substrate 510, a plurality of passive components 101, and at least one routing structure 540 arranged between the top and the bottom substrates. In both configurations, a molding layer 120 is represented, which encapsulates the top substrate and the underlying structures, forming a mechanically stable and environmentally protected package.

In the embodiment shown in FIG. 3A, the routing structure 540 is centrally arranged with respect to the plurality of passive components 101. The routing structure 540 is located substantially at the geometric center of the assembly and may include a cluster of conductive posts, pillars, or vias extending vertically between the top substrate 510 and the bottom substrate 530. The passive components 101 are positioned symmetrically around the central routing structure 540, creating a balanced and compact layout. The central routing structure 540 also enhances thermal dissipation by conducting heat from the interior of the assembly toward the outer layers. The term "centrally arranged" may be understood to allow small positional tolerances, for example within 5-15% of the overall lateral dimension from the geometric center of the assembly. In the embodiment illustrated in FIG. 3B, the routing structure 540 is circumferentially arranged around the plurality of passive components 101. The routing structure 540 in this configuration forms a ring-like arrangement near the periphery of the converter assembly, for instance within a region extending from about 80% to 100% of the radial distance from the center of the structure. The passive components 101 are grouped within the enclosed area defined by the routing structure 540. This configuration can act as a thermal frame, facilitating heat transfer laterally outward toward exposed surfaces or a heat sink.

Both the central and circumferential configurations can be combined in certain embodiments, allowing routing structures 540 to be positioned both at the center and along the perimeter of the assembly. This combined layout can provide improved electrical performance and thermal balance by supporting separate current or signal domains while maintaining mechanical symmetry. The electrical connections can also be established through the terminals of the passive components.

Figure 4:
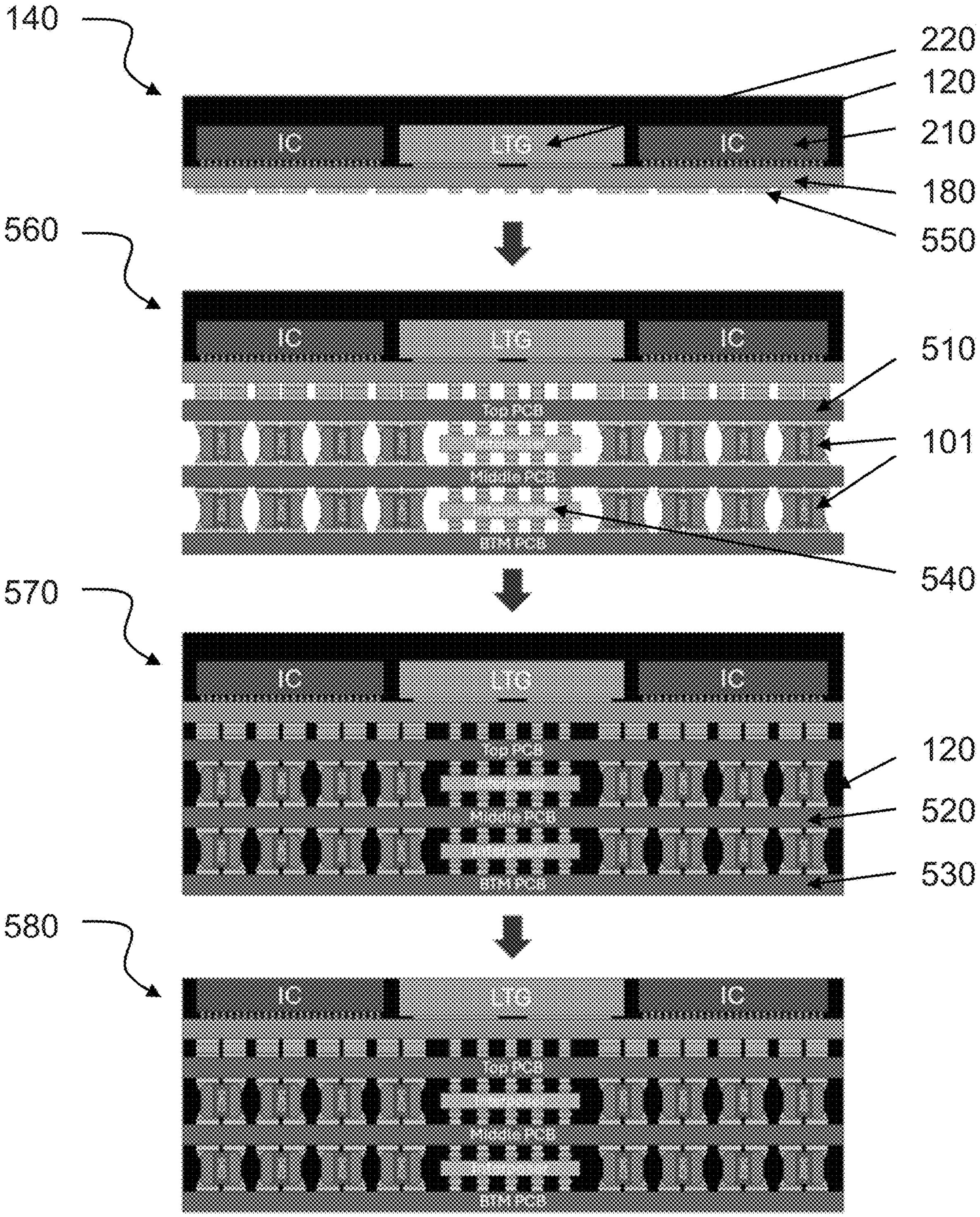
FIG. 4 illustrates a schematic sequence of an embodiment of the stacked power converter assembly 560, showing the progressive stacking and encapsulation of the active sub-assembly 140, the top, middle, and bottom substrates 510, 520, 530, the routing structures 540, the passive components 101, and the molding layer 120, resulting in the encapsulated and grinded stacked power converter assembly 580.

FIG. 4 shows a schematic cross-sectional sequence illustrating the stacked power converter assembly and encapsulation process of an embodiment of the stacked power converter assembly 560. In the upper part of FIG. 4, the active sub-assembly 140 is shown. The active sub-assembly comprises one or more integrated circuits 210 mounted on a sub-assembly substrate 180. One or more thermal guides 220 are comprised in the active sub-assembly and arranged on the sub-assembly substrate 180. The sub-assembly substrate 180 includes active sub-assembly pads 550 that serve as electrical and thermal connection interfaces to the underlying stack. The active sub-assembly 140 may be partially encapsulated within a molding layer 120 to form a molded active sub-assembly 140 that provides mechanical stability and environmental protection.

The next stage in FIG. 4 illustrates the integration of the molded active sub-assembly 140 on top of the passive sub-assembly. The passive stack includes a top substrate 510, a middle substrate 520, and a bottom substrate 530, each of which may comprise through-substrate vias and conductive traces for electrical routing. Between these substrates, passive components 101 are preferably vertically aligned. The routing structures 540 may be implemented as interposers, conductive pillars, or filled vias that provide both electrical and thermal connectivity through the stack. Each substrate may include redistribution layers or conductive pads that facilitate solder or conductive adhesive bonding to adjacent components.

As shown in the intermediate stage, the stacked power converter assembly is assembled to form an encapsulated stacked power converter assembly 570. The passive components 101 and routing structures 540 are encapsulated in the molding layer 120, creating a uniform mechanical structure with improved thermal conductivity. The alignment between the thermal guides 220 in the active sub-assembly 140 and the routing structures 540 in the molded passive sub-assembly 160 ensures that heat generated by the integrated circuits 210 or by the passive components 101 can be efficiently transferred through the entire stacked power converter assembly toward the outer surfaces or heat sink.

In the final stage, represented by the encapsulated and grinded stacked power converter assembly 580, the outer surfaces of the molding layer 120 are planarized by grinding or polishing. This step exposes selected portions of the integrated circuits 210 and the thermal guides 220 to create direct thermal interfaces for external cooling or electrical contact. The finished structure forms a compact and robust power converter assembly with optimized thermal dissipation and a strong ground.

Figure 5:
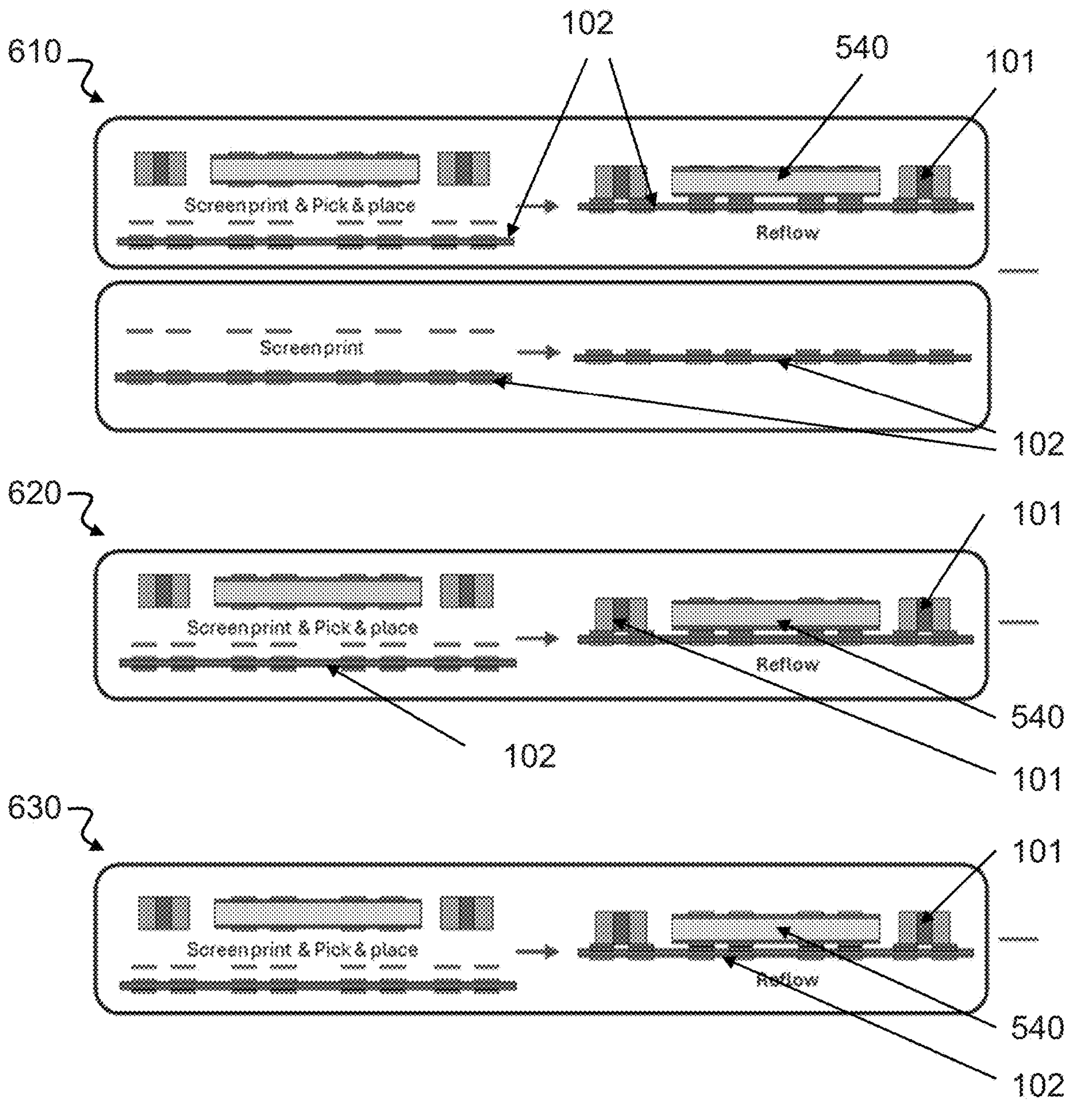
FIG. 5 illustrates schematic cross-sectional views of an embodiment of the method for manufacturing a passive sub-assembly, showing sequential steps of the assembly process, including the formation of the first substrate sub-assembly 610, the second substrate sub-assembly 620, and the third substrate sub-assembly 630, their subsequent flipping and stacking, and the progressive creation of the multi-layered passive sub-assembly 150 comprising routing structures 540, passive components 101, and structures 102.
Figure 5:
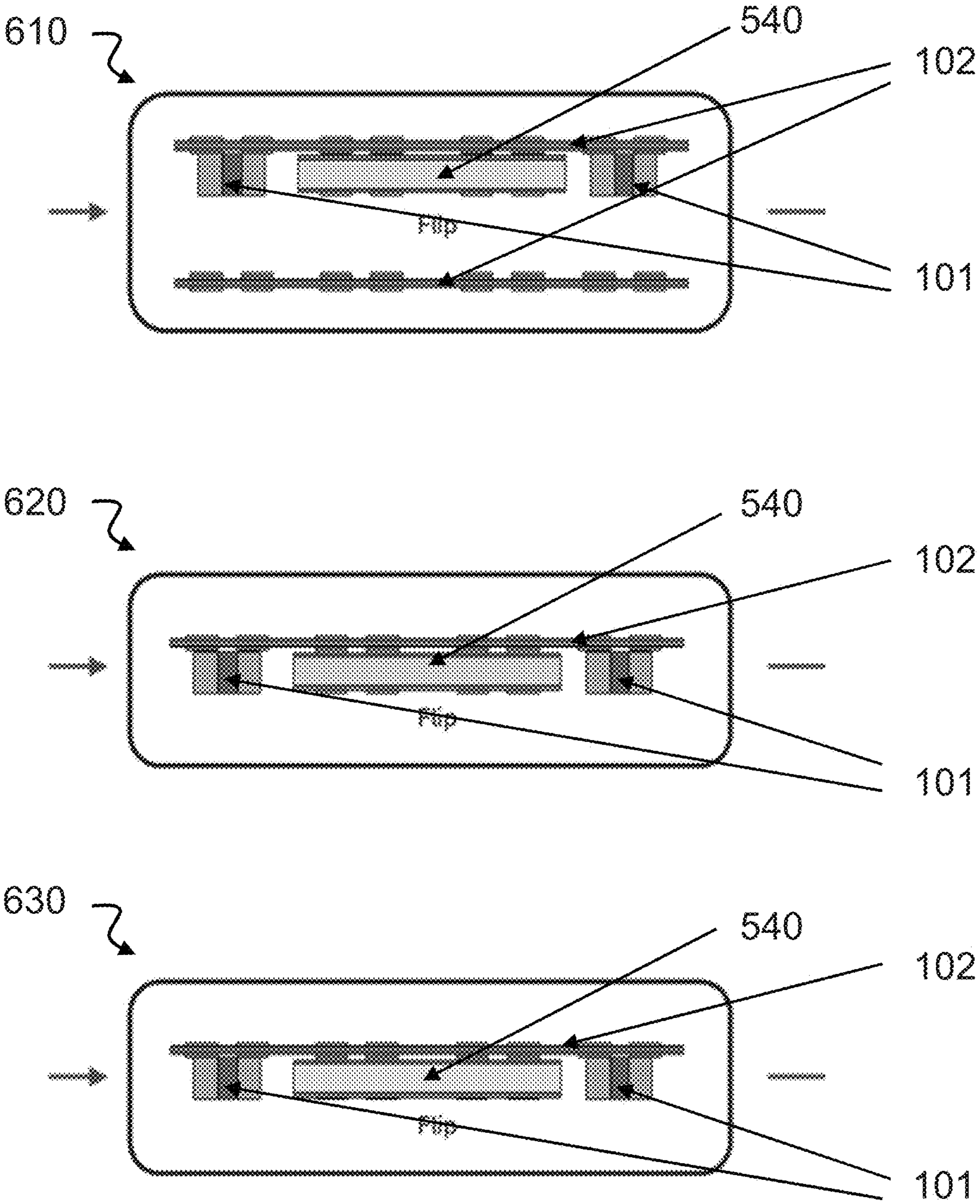
Figure 5:
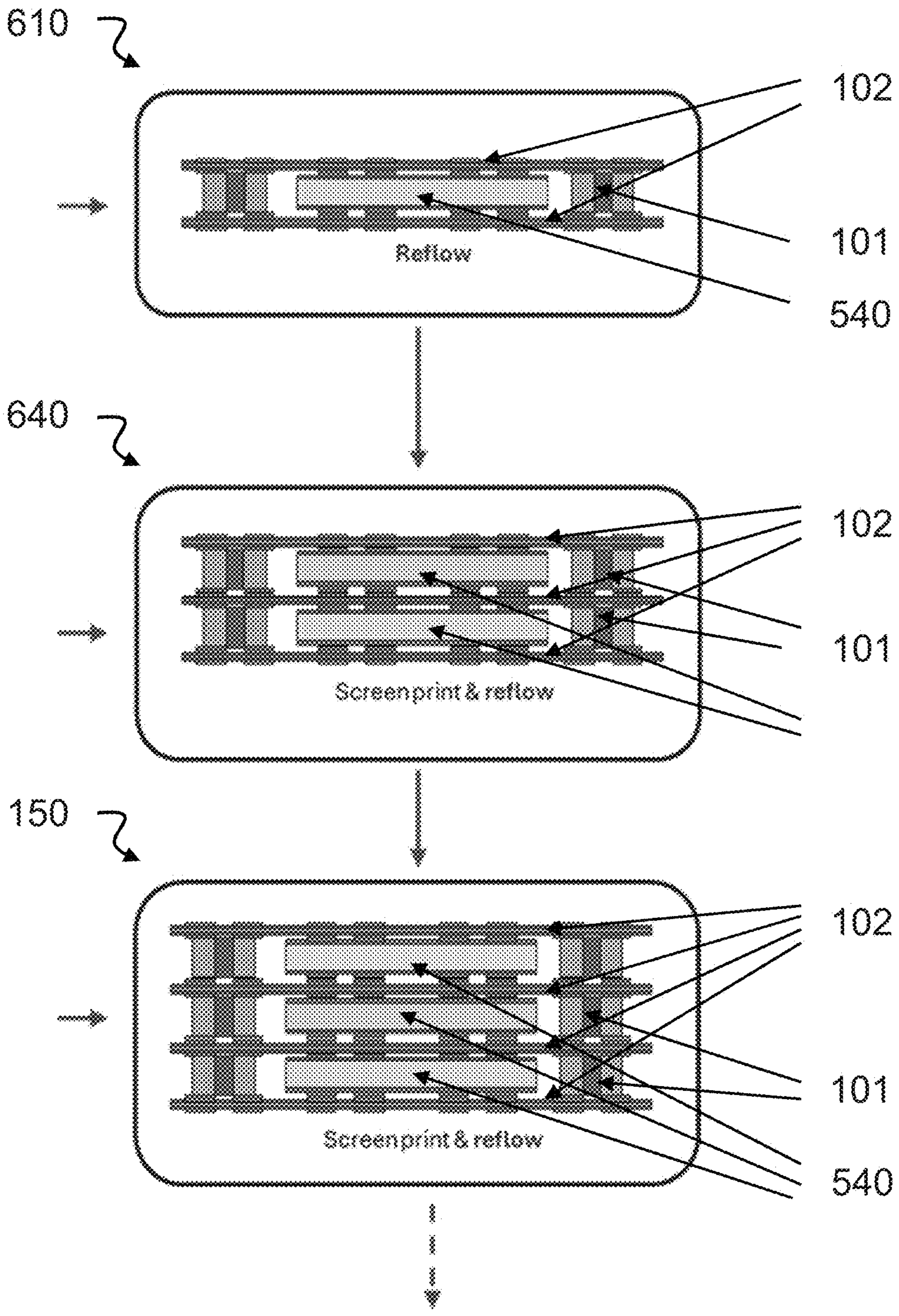

FIG. 5 shows a sequence of schematic cross-sectional views representing different stages in an embodiment of the method of manufacturing a passive sub-assembly according to the present disclosure. The manufacturing process proceeds through successive steps in which multiple substrate sub-assemblies are fabricated, flipped, and stacked to form a three-dimensional passive sub-assembly, comprising vertically aligned passive components and routing structures. The first stage illustrates the preparation of the first 610 and second 620 substrate sub-assemblies. In this step, one or more substrates/structures 102 are provided and subjected to a screen-printing and pick-and-place process. Solder paste is applied to the designated pad areas, and the passive components 101 are positioned on the substrate using automated placement tools. After placement, a reflow process is performed to create solder joints that electrically and mechanically bond the passive components to the substrate/structure. The routing structures 540, such as interposers or conductive pillars, are also attached to the substrate during this step to provide vertical interconnections for subsequent stacking. A second substrate/structure 102 may be prepared in parallel, using similar screen-printing and soldering steps, to allow simultaneous or subsequent bonding to the first substrate/structure.

In the next stage, a second substrate sub-assembly 620 is prepared following a similar procedure. Passive components 101 are arranged and soldered on the corresponding substrate 102 using screen-printing and reflow techniques. The routing structures 540 are aligned with those of the first sub-assembly to ensure electrical continuity through the stacked configuration. The second substrate sub-assembly is then flipped and aligned so that the passive components of the first and second sub-assemblies face each other. In an intermediate stage, an assembly comprising the first and second substrate sub-assemblies 640 is performed.

A third substrate sub-assembly, identified as 630, may be fabricated using the same approach, incorporating additional layers of substrates/structures 102, passive components 101, and routing structures 540. After screen-printing and reflow, the third sub-assembly is flipped and aligned with the previous stack of first and second substrate sub-assemblies to form a three-layer arrangement, such as a three-layer passive sub-assembly. The use of multiple sub-assemblies allows for a modular build-up of the passive sub-assembly, where each layer can be independently manufactured, inspected, and tested prior to final stacking.

The subsequent stages of FIG. 5 (cont'd) illustrate how the individual sub-assemblies are progressively joined together through additional screen-printing and reflow steps. Each new layer is bonded to the underlying one, resulting in a fully integrated multi-stack passive sub-assembly. The reflow process ensures that solder connections are formed consistently across all interconnect levels, securing both the mechanical stability and the electrical continuity of the stack. In the final stage, the completed multi-layer passive sub-assembly 150 is obtained. The assembly includes multiple vertically aligned passive components 101 and routing structures 540 distributed between a plurality of substrates/structures 102. The passive sub-assembly 150 configuration as illustrated in FIG. 5 provides a high-density arrangement of passives interconnected through short and efficient conductive paths.

The stacked power converter assembly as disclosed herein may be implemented in a variety of DC-DC converter systems beyond the switched-capacitor topology. In some embodiments, the stacked power converter assembly may form part of an inductive converter, such as a buck, boost, or buck-boost converter, in which one or more inductors are integrated within the stacked power converter assembly together with switching transistors controlled by and comprised in the at least one integrated circuit. In further embodiments, the stacked power converter assembly may also be configured to perform hybrid or resonant power conversions, via topologies such as SEPIC, Ćuk, or hybrid switched-capacitor converters, combining capacitive and inductive energy-transfer elements. The disclosed stacked power converter assembly can be equally suitable for multiphase or point-of-load voltage regulators, where several converter stages operate in parallel using shared or distributed passive networks, comprising the plurality of passive components. By supporting these various topologies, the stacked power converter assembly can provide a general platform for compact, high-efficiency power conversion across a wide range of electronic systems.

In a second aspect of the present disclosure, a method of manufacturing a stacked power converter assembly is disclosed herein.

In one embodiment of the present disclosure, the method further comprises the step of flipping and aligning the bottom structure relative to the top structure. The flipping operation may be performed after the passive components and routing structures are mounted on the bottom structure, enabling the bottom structure to be positioned such that its component-bearing side faces the top structure. Precise alignment between the two structures may be achieved through optical alignment systems or mechanical alignment pins that ensure matching of vias, pads, and passive component terminals. This alignment step is important to guarantee accurate electrical connection and uniform mechanical contact when the structures are subsequently joined. The flipping process may be carried out using automated handling equipment designed to prevent displacement of the passives or routing structures.

In a preferred embodiment of the present disclosure, the method further comprises the steps of providing a middle structure, a plurality of middle passive components, and a middle routing structure; arranging the plurality of middle passive components and the middle routing structure on the middle structure, thereby providing a second sub-assembly; arranging the second sub-assembly on the first sub-assembly, thereby providing the second sub-assembly within the passive sub-assembly. The inclusion of a middle structure in the assembly process can allow the manufacture of multilayer stacks with increased passive components density. Each sub-assembly can be individually fabricated and tested prior to stacking, ensuring that only fully functional units are integrated. The middle sub-assembly may be bonded to the lower sub-assembly using solder reflow, compression bonding, or conductive adhesive processes. This modular approach can facilitate production scalability, allowing the number of stacked layers to be adjusted depending on the required performance.

In another embodiment of the present disclosure, the method further comprises the step of providing one or more thermal guides, wherein the active sub-assembly comprises the one or more thermal guides. The thermal guides may be positioned prior to or after the attachment of the integrated circuit to the active sub-assembly, depending on the assembly process. They may be attached by soldering, adhesive bonding, or direct metallurgical connection to ensure intimate thermal contact with heat-generating elements. The integration of thermal guides at this stage may ensure that they are structurally embedded in the assembly, creating a continuous heat conduction path through the stacked power converter. This inclusion can support consistent thermal performance and simplifies subsequent encapsulation and packaging operations.

In one embodiment of the present disclosure, the method further comprises the step of encapsulating the passive sub-assembly in a first molding material. The encapsulation step may be carried out using transfer molding, compression molding, or liquid encapsulation techniques to cover the passive components and routing structures. The first molding material may comprise epoxy resin, silicone, or another thermally conductive but electrically insulating polymer material. The first molding material can provide mechanical stability and environmental protection for the encapsulated parts, sealing them from humidity and contaminants. The encapsulation can also improve thermal spreading by embedding the components within a material of controlled thermal conductivity. The use of a first encapsulation stage specifically for the passive sub-assembly ensures that the passives are fully protected before integrating the more sensitive active components, thereby improving process reliability and module durability.

In another embodiment of the present disclosure, the method further comprises the step of encapsulating the stacked power converter assembly in a second molding material. This final encapsulation may cover the entire stacked power converter, including both passive and active sub-assemblies, providing a unified protective housing. The second molding material may be similar or identical in composition to the first molding material but applied in a thicker or more uniform layer to improve external mechanical robustness. The second encapsulation step may also define the external package geometry and form standardized interfaces such as leads, solder pads, or exposed thermal surfaces. This approach can create a fully encapsulated stacked power converter module that can be handled and mounted as a single component. The dual encapsulation process, involving separate molding steps for the passive and final assemblies, allows precise control over internal stress distribution and enhances long-term reliability under thermal cycling and mechanical vibration.

In a preferred embodiment of the present disclosure, the method further comprises the step of grinding the top surface and/or one or more side surfaces of the stacked power converter assembly, thereby exposing at least one top surface of the at least one integrated circuit and/or the one or more thermal guides. The grinding step may be performed after final molding to remove excess material and to expose metallic or semiconductor surfaces that serve as thermal or electrical contact points. Precision grinding can ensure a flat and smooth surface suitable for attaching heat sinks or for direct interface with system-level thermal management elements. When thermal guides or integrated circuits are exposed, they can form low-thermal-resistance interfaces to external cooling structures, improving overall heat dissipation. The process may employ chemical mechanical polishing or fine abrasive machining techniques to achieve the desired surface finish without damaging the encapsulated components. The ability to expose selected surfaces through grinding provides design flexibility for different packaging configurations while maintaining compactness.

In one embodiment of the present disclosure, the stacked power converter assembly manufactured according to the method is the stacked power converter assembly as disclosed herein. The structural and functional characteristics described for the stacked power converter assembly, including vertical interconnections, thermally conductive routing structures, and aligned passive components, can be directly applicable to the method of manufacturing as disclosed herein. The method steps collectively enable the realization of such an assembly with high precision and reproducibility. By combining established semiconductor packaging techniques with multilayer assembly processes, the disclosed method provides a scalable manufacturing route for compact, high-efficiency, and thermally optimized stacked power converter assemblies or modules suitable for integration in a wide range of electronic systems.

REFERENCE LIST

150 passive sub-assembly
160 molded passive sub-assembly
120 molding
101 passive components
102 plurality of structures
200 metal clips
190 lead frame substrate
140 molded active sub-assembly
183 structure solder pads
180 sub-assembly substrate
210 integrated circuit
220 thermal guide
510 top substrate
520 middle substrate
530 bottom substrate
540 routing structure
550 active sub-assembly pads
310 top solder pads
320 bottom solder pads
560 stacked power converter assembly
570 encapsulated stacked power converter assembly
580 encapsulated and grinded stacked power converter assembly
610 first substrate sub-assembly
620 second substrate sub-assembly
630 third substrate sub-assembly

What is claimed is:

1. A stacked power converter assembly comprising:
a passive sub-assembly comprising:
a plurality of substrates comprising a top substrate and a bottom substrate;
a plurality of passive components, each comprising at least one terminal or a plurality of terminals, wherein the plurality of passive components is arranged on the bottom substrate;
at least one routing substrate, wherein the at least one routing substrate is configured to provide a vertical connection between the top and the bottom substrates, and wherein the at least one routing substrate comprises at least one routing through-substrate via, wherein the at least one routing through-substrate via is configured to provide the vertical connection between the plurality of substrates; and
an active sub-assembly comprising at least one integrated circuit, wherein the active sub-assembly is arranged on the top substrate.

2. The stacked power converter assembly according to claim 1, wherein the active sub-assembly further comprises an active sub-assembly substrate, and wherein the at least one integrated circuit is arranged on the active sub-assembly substrate.

3. The stacked power converter assembly according to claim 1, wherein the plurality of passive components are configured to perform an electrical connection between the top substrate and the bottom substrate.

4. The stacked power converter assembly according to claim 1, wherein the plurality of passive components comprises a plurality of capacitors or a plurality of inductors, and wherein the plurality of capacitors or the plurality of inductors are Surface-Mount Device (SMD) components.

5. The stacked power converter assembly according to claim 1, wherein the at least one routing substrate comprises at least one dummy passive component, such as a dummy capacitor or a dummy inductor.

6. The stacked power converter assembly according to claim 1, wherein the at least one routing substrate is centrally arranged, such that the at least one routing substrate is arranged in the middle of the plurality of substrates, and is surrounded by the plurality of passive components.

7. The stacked power converter assembly according to claim 1, wherein the at least one routing substrate is circumferentially arranged, such that the at least one routing substrate is arranged at the circumference of the plurality of substrates, and surrounds the plurality of passive components.

8. The stacked power converter assembly according to claim 1, wherein the at least one routing substrate comprises at least one of:
at least one interposer;
an organic substrate;
a ceramic substrate;
a metal substrate;
a glass substrate; and
a silicon substrate.

9. The stacked power converter assembly according to claim 1, wherein the plurality of substrates or the active sub-assembly arranged on the top substrate comprises:
an organic substrate;
a ceramic substrate;
a metal substrate;
a glass substrate; and
a silicon substrate.

10. The stacked power converter assembly according to claim 1, wherein the passive sub-assembly or the active sub-assembly is configured to be encapsulated in a first molding material.

11. The stacked power converter assembly according to claim 1, wherein the passive sub-assembly further comprises a middle substrate, arranged between the top substrate and the bottom substrate, and wherein the plurality of passive components is further arranged on the middle substrate.

12. The stacked power converter assembly according to claim 1, wherein one or more of the top substrate, the middle substrate, and the bottom substrate, comprises at least one through-substrate via.

13. The stacked power converter assembly according to claim 1, wherein the plurality of passive components are arranged on one or more of the top substrate, the middle substrate, and the bottom substrate, and are in vertical alignment such that corresponding terminals of the plurality of passive components are aligned along a common vertical axis and are configured to be directly electrically connected.

14. The stacked power converter assembly according to claim 1, wherein the plurality of passive components are arranged on the middle substrate and the bottom substrate, and wherein the plurality of passive components are positioned substantially on top of each other such that the plurality of terminals are aligned in a vertical direction.

15. The stacked power converter assembly according to claim 1, wherein the plurality of passive components are arranged on the bottom substrate according to a first layout, and wherein the passive components on one or both of the top substrate and the middle substrate are arranged according to the first layout, such that the plurality of passive components on the different substrates are positioned in vertical alignment.

16. The stacked power converter assembly according to claim 1, wherein one or both of the active sub-assembly and the passive sub-assembly comprises one or more thermal guides, and wherein the one or more thermal guides are arranged in the active sub-assembly such that the one or more thermal guides are vertically aligned with the at least one routing substrate, and wherein the one or more thermal guides are configured to be connected to the at least one routing substrate.

17. The stacked power converter assembly according to claim 1, wherein the vertical connection is a thermal or an electrical connection.

18. The stacked power converter assembly according to claim 1, wherein the top surface of the active sub-assembly comprises at least one active sub-assembly pad, and wherein the at least one active sub-assembly pad is configured to be connected to a ground an electrical ground.

19. A method of manufacturing a stacked power converter assembly, the method comprising:

providing a bottom substrate, a plurality of passive components, and at least one routing substrate;

arranging the at least one routing substrate and the plurality of passive components on the bottom substrate;

providing a top substrate;

arranging the top substrate on the plurality of passive components and the at least one routing substrate, thereby providing a passive sub-assembly;

providing an active sub-assembly comprising at least one integrated circuit;

arranging the active sub-assembly on the top substrate, thereby providing the stacked power converter assembly; and wherein the at least one routing substrate is configured to provide a vertical connection between the top and the bottom substrates, and wherein the at least one routing substrate comprises at least one routing through-substrate via, wherein the at least one routing through-substrate via is configured to provide the vertical connection between the plurality of substrates.

20. A switched-capacitor DC-DC converter, wherein the switched-capacitor DC-DC converter comprises:

an input terminal;

an output terminal; and a stacked power converter assembly comprising:

a passive sub-assembly comprising:

a plurality of substrates comprising a top substrate and a bottom substrate;

a plurality of passive components, each comprising at least one terminal or a plurality of terminals, wherein the plurality of passive components is arranged on the bottom substrate;

at least one routing substrate, wherein the at least one routing substrate is configured to provide a vertical connection between the top and the bottom substrates, and wherein the at least one routing substrate comprises at least one routing through-substrate via, wherein the at least one routing through-substrate via is configured to provide the vertical connection between the plurality of substrates; and an active sub-assembly comprising at least one integrated circuit, wherein the active sub-assembly is arranged on the top substrate; and wherein the input terminal and the output terminal are arranged on the stacked power converter assembly, and wherein the input terminal is configured to provide an input signal to the switched-capacitor DC-DC converter and the output terminal is configured to deliver an output signal configured to be delivered to a load.

* * * * *